United States Patent
Lam

(10) Patent No.: US 11,175,395 B2
(45) Date of Patent: Nov. 16, 2021

(54) ANGLE ONLY TARGET TRACKING SOLUTION USING A BUILT-IN RANGE ESTIMATION

(71) Applicant: BAE SYSTEMS Information and Electronic Systems Integration Inc., Nashua, NH (US)

(72) Inventor: Quang M. Lam, Fairfax, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 333 days.

(21) Appl. No.: 16/163,721

(22) Filed: Oct. 18, 2018

(65) Prior Publication Data

US 2020/0124715 A1    Apr. 23, 2020

(51) Int. Cl.
*G01S 13/68* (2006.01)
*G01S 13/42* (2006.01)
*G01S 13/72* (2006.01)

(52) U.S. Cl.
CPC ............ *G01S 13/68* (2013.01); *G01S 13/426* (2013.01); *G01S 13/726* (2013.01)

(58) Field of Classification Search
CPC ....... G01S 13/68; G01S 13/426; G01S 13/726
USPC .......................................................... 342/62
See application file for complete search history.

(56) References Cited

U.S. PATENT DOCUMENTS

| | | | | |
|---|---|---|---|---|
| 4,004,487 A | * | 1/1977 | Eichweber | F41A 23/34 89/1.815 |
| 4,111,382 A | * | 9/1978 | Kissinger | F41G 3/08 244/3.1 |
| 4,545,576 A | * | 10/1985 | Harris | A63B 69/00 340/323 R |
| 5,099,747 A | * | 3/1992 | Smith | F42B 12/362 89/1.13 |

(Continued)

FOREIGN PATENT DOCUMENTS

WO    WO-2004015369 A2  *  2/2004  .......... G01C 25/005
WO    2007/016098 A2      2/2007

OTHER PUBLICATIONS

"Heterodyne", https://en.wikipedia.org/wiki/Heterodyne, known of at least since Apr. 24, 2019.

(Continued)

*Primary Examiner* — Bernarr E Gregory
*Assistant Examiner* — Nuzhat Pervin
(74) *Attorney, Agent, or Firm* — KPIP Law, PLLC; Scott J. Asmus

(57) ABSTRACT

An angle only (AO) target state estimation (TSE) system and method using a mixed coordinate system (Modified Spherical Coordinate (MSC) and Reference Cartesian Coordinate (RCC)) as an integrated system. This integrated system is achieved due to the state vector information of two frames (RCC and MSC) is effectively preserved between processing cycles and state vector transformation steps. The AO TSE architecture and processing schemes are applicable to a wide class of passive sensors. The mixed coordinate system (Continued)

provides robust real-time slant range estimation in a bootstrap fashion, thus turning passive AO measurements into equivalent active sensor measurements with built-in recursive range information but with greatly improved the TSE accuracy meeting the miss distance required by many engagement missions.

14 Claims, 8 Drawing Sheets

(56) References Cited

U.S. PATENT DOCUMENTS

| | | | | |
|---|---|---|---|---|
| 5,577,733 | A * | 11/1996 | Downing | F41J 1/10 250/222.2 |
| 5,680,514 | A * | 10/1997 | Shams | G01S 5/04 706/24 |
| 5,798,942 | A * | 8/1998 | Danchick | G01S 3/7864 342/36 |
| 5,959,574 | A * | 9/1999 | Poore, Jr. | G01S 13/726 342/96 |
| 6,038,955 | A * | 3/2000 | Thiesen | F41G 3/142 89/41.06 |
| 6,057,915 | A * | 5/2000 | Squire | G01S 7/48 356/139.05 |
| 6,148,271 | A * | 11/2000 | Marinelli | A63B 43/00 702/141 |
| 6,922,632 | B2 * | 7/2005 | Foxlin | G01C 21/16 342/357.31 |
| 7,089,845 | B2 * | 8/2006 | Friedli | F41G 3/06 42/115 |
| 8,120,526 | B2 * | 2/2012 | Holder | G01S 13/003 342/140 |
| 8,854,252 | B2 * | 10/2014 | Holder | G01S 13/003 342/107 |
| 8,942,421 | B1 * | 1/2015 | Virgilio | G06K 9/0063 382/103 |
| 8,946,606 | B1 * | 2/2015 | Dennison | F41G 7/2293 244/3.16 |
| 9,401,741 | B2 * | 7/2016 | Holder | H04B 1/7097 |
| 9,696,418 | B2 * | 7/2017 | Holder | F41G 7/2286 |
| 2003/0144078 | A1 * | 7/2003 | Setokawa | A63B 53/0466 473/345 |
| 2003/0145719 | A1 * | 8/2003 | Friedli | F41G 3/06 89/41.05 |
| 2004/0073360 | A1 * | 4/2004 | Foxlin | G01C 21/16 701/517 |
| 2004/0119020 | A1 * | 6/2004 | Bodkin | G01J 3/0278 250/353 |
| 2005/0021282 | A1 * | 1/2005 | Sammut | G02B 23/14 702/150 |
| 2005/0114023 | A1 * | 5/2005 | Williamson | G01S 19/47 701/472 |
| 2005/0153787 | A1 * | 7/2005 | Kim | A63B 69/3652 473/160 |
| 2006/0027404 | A1 * | 2/2006 | Foxlin | G01C 21/16 178/18.06 |
| 2006/0074558 | A1 * | 4/2006 | Williamson | G01S 19/20 701/469 |
| 2007/0044364 | A1 * | 3/2007 | Sammut | F41G 1/473 42/122 |
| 2010/0001998 | A1 * | 1/2010 | Mandella | G06F 3/03545 345/419 |
| 2012/0257050 | A1 * | 10/2012 | Simon | G01S 11/12 348/135 |
| 2012/0316819 | A1 * | 12/2012 | Martell | G01S 13/878 702/94 |
| 2014/0372026 | A1 * | 12/2014 | Georgy | G01S 19/47 701/469 |
| 2016/0055671 | A1 * | 2/2016 | Menozzi | G01S 5/16 701/300 |
| 2016/0082597 | A1 * | 3/2016 | Gorshechnikov | B25J 9/1664 700/253 |
| 2017/0131096 | A1 * | 5/2017 | Karlov | G01C 21/165 |
| 2017/0193830 | A1 * | 7/2017 | Fragoso | G05D 1/102 |
| 2017/0314892 | A1 * | 11/2017 | Holder | F41G 7/303 |

OTHER PUBLICATIONS

"Interferometry", https://en.wikipedia.org/wiki/Interferometry, known of at least since Apr. 24, 2019.
Monopulse radar, https://en.wikipedia.org/wiki/Monopulse_radar, known of at least since Apr. 24, 2019.
"Pulse-Doppler signal processing", https://en.wikipedia.org/wiki/Pulse-Doppler_signal_processing, known of at least since Apr. 24, 2019.
"Undersampling", https://en.wikipedia.org/wiki/Undersampling, known of at least since Apr. 24, 2019.
Armin W. Doerry, "SAR Processing with Stepped Chirps and Phased Array Antennas", Sandia Report, Sandia National Laboratories, Printed Sep. 2006, Albuquerque, NM.
M. Mallick et al., "Angle-only filtering in 3D using Modified Spherical and Log Spherical Coordinates", 14th International conference on Information Fusion, Chicago, Illinois; pp. 1905-1912, Jul. 5-8, 2011.
K. Radhakrishnan et al., "Bearing only Tracking of Maneuvering Targets using a Single Coordinated Turn Model", International Journal of Computer Applications (0975-8887) vol. 1—No. 1, pp. 25-33; 2010.

* cited by examiner

ANGLE ONLY TARGET TRACKING SOLUTION USING A BUILT-IN RANGE ESTIMATION

FIELD OF THE DISCLOSURE

The present disclosure relates to an angle only (AO) estimation solution associated with a single passive sensor (i.e., Infrared search and track (IRST), EO/IR camera, or passive sonar) for target estimation and tracking using a built-in range estimation for improved accuracy as compared to typical the angle only measurements solutions.

BACKGROUND OF THE DISCLOSURE

Angle only estimation typically requires multiple sensors mixing of both passive and active to improve or achieve the system's required accuracy. For instance, a mixing of RF active seeker and passive EO/IR seeker in order to eliminate the weakness of the AO estimation solution by having the range information provided by the RF seeker. Despite attempts to address varying coordinate systems for detectors, the resulting accuracy of typical angle only solutions are about several hundred meters (~0.5 km).

In contrast, the proposed AO estimation approach uses a mixed coordinate system (i.e., reference Cartesian coordinate (RCC) and a modified spherical coordinate (MSC)) to eliminate the numerical instability (due to lack of slant range) and observability sensitivity inherent in the conventional approaches, thereby, consistently improving the angle only based sensor's target estimation solution accuracy to less than 10 m.

SUMMARY OF THE DISCLOSURE

The bearing and elevation angle measurement filtering problem arising from passive sensors (e.g., EO/IR seeker, passive sonar), also known as the angle only (AO) target tracking problem, is well-known in the target tracking and estimation community for the past two decades. This is especially true for 3-D target state estimation (TSE) solution accuracy needed for meeting stringent weapon target engagement requirements. Researchers have continuously examined this problem at the root-cause level, i.e., inherent range unavailability (presented above) and the compounded observability issue due to uniform motion or static targets for which the angle only measurements sensors are not able to indirectly capture the range information implicitly buried in the angle only measurements.

One aspect of the present disclosure is a complete angle only (AO) target tracking and estimation method comprising: initialization states, including $\hat{z}$ and $\hat{x}$ for $f_x$ and $f_z$, of a modified spherical coordinate (MSC) and reference Cartesian coordinate (RCC) system based on operating conditions of an engagement mission; calculating modified spherical coordinate (MSC) measurement predictions, including $\hat{z}$ as a function of reference Cartesian coordinate (RCC) and $\hat{x}$ via a nonlinear mapping function $f_z(\hat{x})$; and calculating mixed coordinate system blocks, including $J_{fx}$, $J_{fz}$, $\Phi$, and $Q^{MSC}$, to provide for individual mixed AO TSE processing steps for use in angle only (AO) target tracking and estimation with a miss distance accuracy of less than 30 m.

One embodiment of the complete angle only (AO) target tracking and estimation method is wherein a steady state 3-D position error in three axes is less than 1 m. In some cases, the method is performed on-board a projectile using a single passive sensor.

Another embodiment of the complete angle only (AO) target tracking and estimation method is wherein the single sensor is configured to track multiple targets. In some cases, the multiple targets are in motion.

Another aspect of the present disclosure is a complete angle only (AO) target tracking and estimation method, comprising: updating angle only (AO) measurements in a modified spherical coordinate (MSC) system from a single passive sensor; transforming data from the modified spherical coordinate (MSC) system to a reference Cartesian coordinate (RCC) system; time updating in the reference Cartesian coordinate (RCC) system; transforming data from the reference Cartesian coordinate (RCC) system to the modified spherical coordinate (MSC) system; and calculating the angle only (AO) measurements at a sensor interface level for use in guiding a projectile to a target with a miss distance of less than 30 m.

One embodiment of the complete angle only (AO) target tracking and estimation method is wherein a steady state 3-D position error in three axes is less than 1 m. In some cases, the method is performed on-board a projectile using a single passive sensor.

Another embodiment of the complete angle only (AO) target tracking and estimation method is wherein the single sensor is configured to track multiple targets. In some cases, the multiple targets are in motion.

Yet another embodiment of the complete angle only (AO) target tracking and estimation method is wherein transforming data from the modified spherical coordinate (MSC) system to the reference Cartesian coordinate (RCC) system follows: $\hat{x}_{k-1|k-1}=f_x(\hat{z}_{k-1|k-1})$.

Still another embodiment of the complete angle only (AO) target tracking and estimation method is wherein transforming data from the reference Cartesian coordinate (RCC) system to the modified spherical coordinate (MSC) system follows: $\hat{z}_{k|k-1}=f_z(\hat{x}_{k|k-1})$.

Still yet another embodiment of the complete angle only (AO) target tracking and estimation method is wherein measurement updating in modified spherical coordinate (MSC) system follows: $\varepsilon_k = y_k - C\hat{z}_{k|k-1}$, where C=[0 1 0 0 0 0 0 0 1 0 0 0] is derivative free, $\hat{z}_{k|k-1}=\hat{z}_{k|k-1}+K\varepsilon_k$, $\hat{P}_{k|k}=\hat{P}_{k|k-1}-KC\hat{P}_{k|k-1}$, $K=\hat{P}_{k|k-1}C^T S^{-1}$, and $S=C\hat{P}_{k|k-1}C^T+R_k$, where $R_k$ is the sensor measurements noise covariance matrix.

In another embodiment, time updating in the reference Cartesian coordinate (RCC) system follows: $\hat{x}_{k|k-1}=A\hat{x}_{k-1|k-1}+B_w w_k$ where $$A = \begin{bmatrix} 1 & 0 & 0 & T & 0 & 0 \\ 0 & 1 & 0 & 0 & T & 0 \\ 0 & 0 & 1 & 0 & 0 & T \\ 0 & 0 & 0 & 1 & 0 & 0 \\ 0 & 0 & 0 & 0 & 1 & 0 \\ 0 & 0 & 0 & 0 & 0 & 1 \end{bmatrix} \quad B_w = \begin{bmatrix} 0.5T^2 & 0 & 0 \\ 0 & 0.5T^2 & 0 \\ 0 & 0 & 0.5T^2 \\ T & 0 & 0 \\ 0 & T & 0 \\ 0 & 0 & T \end{bmatrix},$$

where T=the filter propagation time, $\hat{P}_{k|k-1}=\Phi_{k|k-1}\hat{P}_{k-1|k-1}\Phi'_{k|k-1}+Q_{k-1}^{msc}$, where $Q_{k-1}$ is expressed in RCC, and the rcc state vector is renamed, $\hat{x}^{rcc}_k$ to $\hat{x}_k$;

$$\Phi_{k|k-1} = \frac{\partial z_k}{\partial z_{k-1}}\bigg|_{\hat{z}} = \frac{\partial z_k}{\partial x_k}\frac{\partial x_k}{\partial x_{k-1}}\frac{\partial x_{k-1}}{\partial z_{k-1}} = J_{fz}(\hat{x}_k)AJ_{fx}(\hat{z}_{k-1});$$

and $Q_{k-1}^{MSC}=J_{fz}(\hat{x}_{k|k})Q_{k-1}J_{fz}(\hat{x}_{k|k})'$.

The complete angle only (AO) target tracking and estimation method according to claim 14, wherein the J terms represent the Jacobian matrix of the MSC and the RCC states.

One aspect of the present disclosure is the system architecture precisely defining and interconnecting information of respective state vectors and measurement predictions between two key coordinate systems: i.e., a reference Cartesian coordinate (RCC) and a modified spherical coordinate (MSC) system so that the inherent range and observability deficiencies associated with the passive sensors can be eliminated.

It is worth pointing out here that one aspect of the present disclosure is the real time processing scheme developed and employed for this dual frame coordinate system mixing. Researchers have attempted to address this problem during the past decade but failed to achieve the level of performance illustrated by this present disclosure.

Another aspect of the proposed mixed coordinate system TSE approach is that individual TSE processing steps, per coordinate frame, have been carefully derived and crafted to effectively retain needed information for the range and observability deficiencies elimination to offer a better solution for the AO target tracking problem compared to others. Another aspect is that the system does not require its (own) platform to conduct or perform any kind of maneuvers to assist the passive sensors to improve its measurement observability, despite intentionally subjecting the system to various target modalities.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
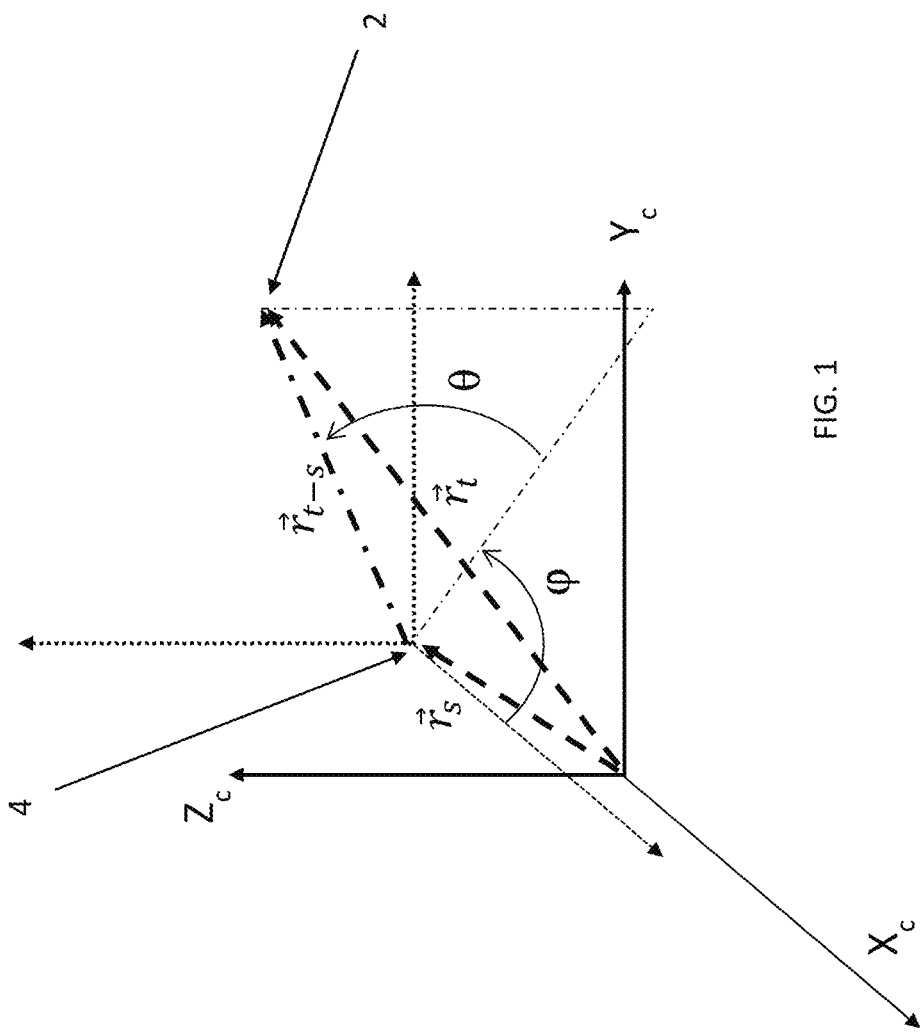
FIG. 1 shows a diagram of the definitions for a reference Cartesian coordinate (RCC) and a modified spherical coordinate (MSC) formulation according to one embodiment of the present disclosure.

Three important contributions of the present disclosure are (1) cohesive architecture managing RCC to MSC frame transformation to process and manage tracking data and information; (2) superior position estimation accuracy beyond current state of the art AO filtering; and (3) a practical design implemented on-board, such that the AO camera views multiple targets and provides high precision track accuracy to less than 30 m.

In one embodiment of the present disclosure, a Jacobian (derivative) based measurement matrix H as a function of the angle only measurements is linearized with respect to the target state estimate (TSE) in a Cartesian coordinate system. This challenge (i.e., Jacobian calculation) implies a numerical instability has potentially occurred at each processing step. In certain embodiments, this is computed per measurement sample.

In some embodiments, the lack of range information inherently exists in the EO/IR camera measurements. This second issue implies insufficient information to fully reconstruct a 3-D vector information at each state level (i.e., 3-D position, 3-D velocity, and 3-D acceleration vectors of the target dynamics captured by the two angle measurements only). From a mathematical standpoint this is illustrated as follows:

$$X_1 = r \cos(\theta) \cos(\phi) \quad (1)$$

$$X_2 = r \cos(\theta) \sin(\phi) \quad (2)$$

$$X_3 = r \sin(\theta) \quad (3)$$

where $X = [X_1\ X_2\ X_3]^T$ is the 3-D position vector computed from the two angles measurements (azimuth and elevation angles, $\phi$ and $\theta$, respectively) and the range r. As shown from equations (1)-(3), if the range information r is missing, the mathematical operation is no longer capable of computing/obtaining the 3-D translational position. Therefore, a linearization of the two angles about the Cartesian coordinate position vector (i.e., $X = [X_1\ X_2\ X_3]^T$) is carried out in order to infer the state vector from the two angles measurements on a sample by sample basis.

In one embodiment of the system of the present disclosure, inherent observability issues associated with the angle only measurement sensors exists. For static targets or uniform motion targets, passive sensors mounted on the system's (own) platform require the platform to maneuver in some fashion so that adequate dynamic information (including inherent range derived from estimated 3-D position) can be captured or observed by the passive sensors. Likewise, for the Cartesian coordinate velocity estimate vector, $\dot{X} = [X_4\ X_5\ X_6]^T$, the velocity estimation accuracy will suffer from the missing range rate and range information as well as the unavailability of angular rate information (i.e., $\dot{\theta}$ & $\omega$) as shown below:

$$x_4 = \dot{r} \cos\theta \cos\phi - r\dot{\theta} \sin\theta \cos\phi - r\omega \sin\phi$$

$$x_5 = \dot{r} \cos\theta \sin\phi - r\dot{\theta} \sin\theta \sin\phi + r\omega \cos\phi$$

$$x_6 = \dot{r} \sin\theta + r\dot{\theta} \cos\theta$$

where $\omega = \dot{\phi} \cos\theta$.

Lack of range, range rate, and angular rate, as discussed above, means the six state target estimate vector (i.e., $[X|\dot{X}]$) cannot be mathematically reconstructed using the aforementioned equations, and the only way to achieve the Target State Estimate (TSE) solution from the two angles measurements is to employ the traditional Extended Kalman Filter (EKF).

In summary, the AO TSE solution using the conventional EKF by processing EO/IR sensor's angle only measurements offers limited performance accuracy due to Jacobian sensitivity, lack of range information, and a requirement for the system's platform to maneuver as discussed above. As a result, the AO TSE solution using the conventional approach is deemed to be inadequate (i.e., position estimation accuracy is larger than 30 m vs truth per axis), thus preventing the projectile from achieving its end game performance goal with an acceptable miss distance (i.e., <1 m for hit to kill or <3 m for weapon detonation to destroy a target). Note that in open literature, the AO TSE position estimation accuracy is only in the range of 500 m or so while the present disclosure offers its position estimation accuracy in the range of 30 m or better throughout various operating conditions.

Wherefore it is an object of the present disclosure to develop a TSE scheme that can overcome the above-mentioned shortcomings and drawbacks associated with the conventional EKF TSE solution and extend its solution accuracy to an acceptable level needed by guidance and navigation subsystems.

One embodiment of the present disclosure provides a better target state estimation (TSE) solution to a weapon's guidance subsystem when only a passive EO/IR sensor is available (i.e., only azimuth and elevation angles measurements) and thus there is no range availability to complete the 3-D state vector information inference as in conventional systems.

In one embodiment of the system of the present disclosure a combination of Cartesian coordinate and spherical coordinate frames are used. This combination reduces the sensitivity caused by the use of a Jacobian matrix arising from an angle only target tracking filter where the EO/IR sensor measurements are generally processed in spherical coordinates.

In some embodiments, the system simultaneously maintains the target state estimate (TSE) vector in Cartesian coordinates to cross feed the TSE written in spherical coordinates. The TSE uses a mixing between Cartesian coordinate and spherical coordinate frames essentially eliminating the Jacobian matrix dependency (if only Cartesian coordinates are employed) while introducing a real time range estimation to feed the two TSE filters as if the system was using a second sensor (e.g. an active RF seeker).

Figure 8:
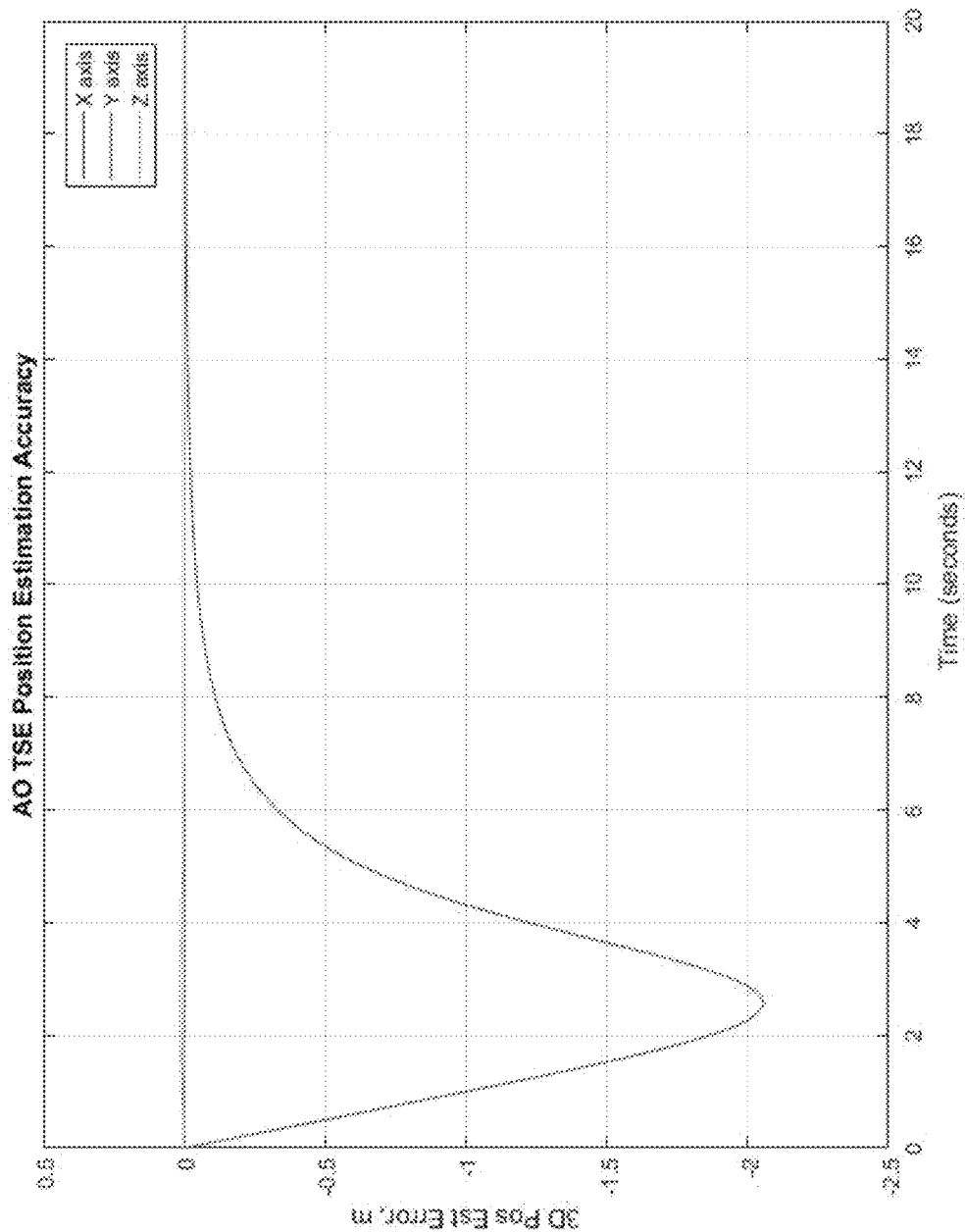
FIG. 8 illustrates the performance of the AO TSE estimation accuracy in all three axes according to the principles of the present disclosure.

In some cases, the system of the present disclosure eliminates the Jacobian matrix dependency in the angle only measurement processing thanks to expression in spherical coordinates during the iterative measurement update stage. This change transforms the nonlinear measurement system into a linear measurement processing step. The system is therefore more robust due in part to the use of a constant matrix H rather than a derivative based Jacobian matrix H. The processing scheme presented in FIG. 3, for example, captures the constant H matrix (completely independent of the angle to state Jacobian expression) while FIG. 8 presents solid performance results for the system. There, the AO TSE of the present disclosure consistently yields a performance of less than 1 m (at steady state) in all three axes (i.e., X, Y, and Z). Note that industry capacity currently exhibits a position estimation accuracy in the neighborhood of several hundred meters (i.e., between 200 m to 500 m) at best.

In certain embodiments, real-time range estimation is implemented as part of the mixed coordinate frame TSE framework, thus turning a passive sensor (EO/IR) based TSE into an equivalent active RF sensor based TSE. As a result, the TSE accuracy produced by this scheme offers a more robust estimation scheme compared to a traditional Cartesian coordinate frame based TSE. FIGS. 5 to 8 exhibit such a performance improvement for the AO TSE of the present disclosure.

The system of the present disclosure is useful for all ranges of weapons applications which use an EO/IR sensor as a sensor for targeting. The system is also useful for optical sensor based intelligence, surveillance, and reconnaissance (ISR) applications for Maritime domain awareness and Space based domain awareness missions.

In some embodiments, the system can be exploited for autonomous object detection and tracking solutions using on-board optical cameras. Specific applications include (i) automated driver assistant system (ADAS) technology development when implemented in a multiple objects multiple sensors framework; (ii) rendezvous, proximity, and docking operations between two objects; and (iii) collision avoidance.

In one embodiment of the system of target tracking, a modified spherical coordinate (MSC) formulation adds new target state vector estimation formed as a function of inverse range and time-to-go along with angle measurements. With the MSC target state vector formulation as a function of two angles, the Jacobian measurement matrix H of nonlinear angles measurements (i.e., azimuth and elevation angles) now becomes a linear time invariant (LTI) system. This essentially eliminates the sensitivity of the Jacobian matrix H of the TSE formulated under the Cartesian coordinate framework. Also, with range estimation computed in real-time from the MSC filter and the elimination of the Jacobian matrix H, the derivation of the mixed filters spherical and Cartesian coordinate frames developed herein will further enhance the TSE accuracy to a much more accurate level (e.g., a design goal of less than 3 m or better with some robust filtering schemes to be applied). For one engagement condition investigated in this effort, the steady state errors in three axes were observed to be even less than 0.5 m (FIG. 8, after 6 seconds of flight time).

Some benefits to the system of the present disclosure includes improving the miss distance (e.g., <10 m from 30 m or larger for conventional systems) by providing a real time (built-in) range estimation as part of the EO/IR measurements. This reduces the sensitivity of the angle only tracking problem and helps the TSE solution to stay within reasonable estimation accuracy; all while keeping hardware costs down. This cost reduction is possible in part due to removing the need for a second sensors (e.g., a laser range finder or the like) for real time range information.

Referring to FIG. 1, a diagram of the definitions for the reference Cartesian coordinate (RCC) and the modified spherical coordinate (MSC) formulations according to one embodiment of the present disclosure is shown. More specifically, the state vector in RCC is defined as a 6×1 vector as follows: $x^{rcc}=x=[\vec{r}_{ts}|\dot{\vec{r}}_{ts}]=[x_i]$, i=1, 2, . . . 6 where $\dot{\vec{r}}_{ts}=x_4\mathbf{i}+x_5\mathbf{j}+x_6\mathbf{k}$=3-D velocity vector of $\vec{r}_{ts}$. The state vector in MSC is defined as a 6×1 vector as follows:

$$z^{msc} = [z_1 \ z_2 \ z_3 \ z_4 \ z_5 \ z_6]' = \left[\frac{1}{r}|\varphi|\theta|\frac{\dot{r}}{r}|\omega|\dot{\theta}\right]'$$

where $r=\|\vec{r}_{ts}\|=\text{range}=\sqrt{x_1^2+x_2^2+x_3^2}$ and $\omega=\dot{\varphi}\cos\theta$. $x_1=r\cos\theta\cos\varphi$; $x_2=r\cos\theta\sin\varphi$; $x_3=r\sin\theta$; $x_4=\dot{r}\cos\theta\cos\varphi-r\dot{\theta}\sin\theta\cos\varphi-r\omega\sin\varphi$; $x_5=\dot{r}\cos\theta\sin\varphi-r\dot{\theta}\sin\theta\sin\varphi+r\omega\cos\varphi$; and $x_6=\dot{r}\sin\theta+r\dot{\theta}\cos\theta$. The EO/IR sensor 4 measures $\varphi$ and $\theta$ used to calculate the location of the target 2 using the TSE of the present disclosure where the range information is provided via the mixed coordinate system approach described herein.

Figure 2:
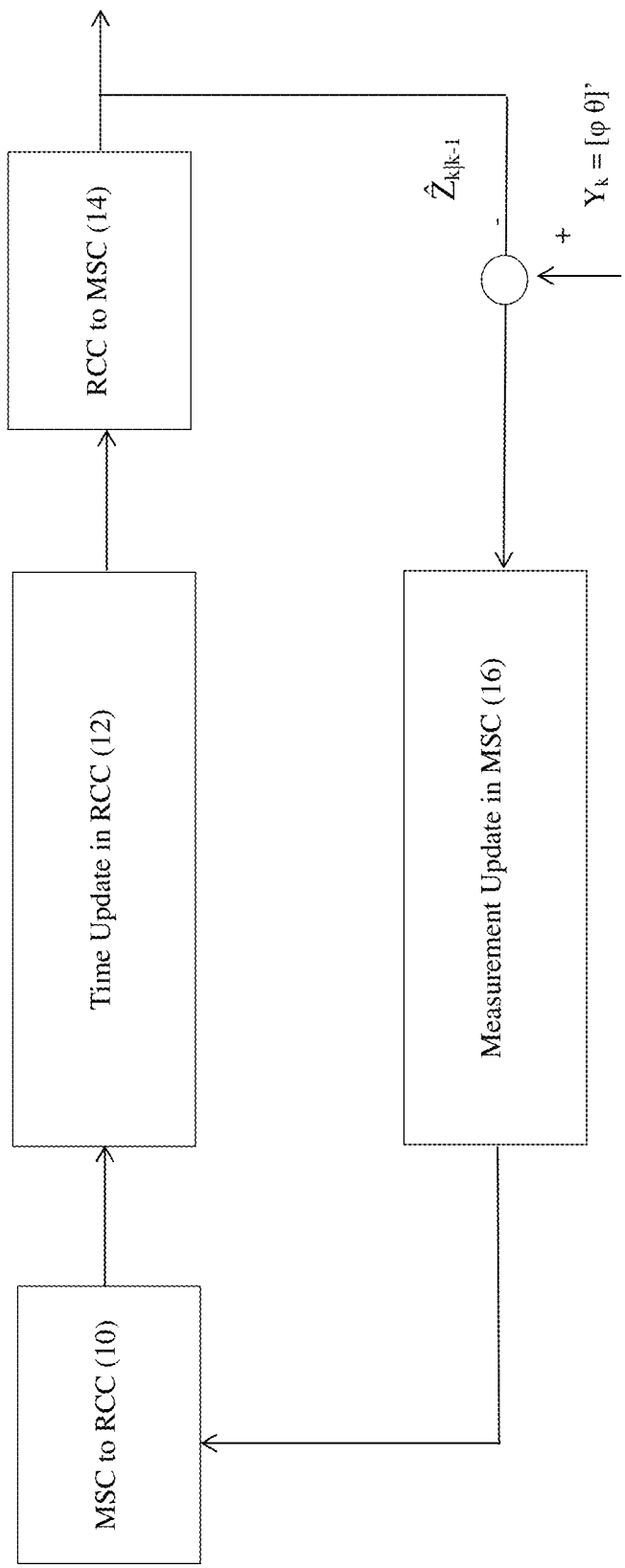
FIG. 2 is a diagram of one embodiment of the mixed coordinates processing architecture for the system of the present disclosure.

Referring to FIG. 2, a diagram of one embodiment of the mixed coordinates processing architecture of the present disclosure is shown. More specifically, the modified spherical coordinates (MSC) are transformed to reference Cartesian coordinates (RCC) according to $\hat{x}_{k-1|k-1}=f_x(\hat{z}_{k-1|k-1})$ 10. The time update step 12 is in RCC according to $\hat{x}_{k|k-1}=A\hat{x}_{k-1|k-1}+B_ww_k$ where $$A=\begin{bmatrix} 1 & 0 & 0 & T & 0 & 0 \\ 0 & 1 & 0 & 0 & T & 0 \\ 0 & 0 & 1 & 0 & 0 & T \\ 0 & 0 & 0 & 1 & 0 & 0 \\ 0 & 0 & 0 & 0 & 1 & 0 \\ 0 & 0 & 0 & 0 & 0 & 1 \end{bmatrix}\quad B_w=\begin{bmatrix} 0.5T^2 & 0 & 0 \\ 0 & 0.5T^2 & 0 \\ 0 & 0 & 0.5T^2 \\ T & 0 & 0 \\ 0 & T & 0 \\ 0 & 0 & T \end{bmatrix},$$

where T=the filter propagation time.

$\hat{P}_{k|k-1}=\Phi_{k|k-1}\hat{P}_{k-1|k-1}\Phi'_{k|k-1}+Q_{k-1}^{msc}$, where $Q_{k-1}$ is expressed in RCC, and the rcc state vector is renamed, $\hat{x}^{rcc}_k$ to $\hat{x}_k$;

$$\Phi_{k|k-1}=\left.\frac{\partial z_k}{\partial z_{k-1}}\right|_{\hat{z}}=\frac{\partial z_k}{\partial x_k}\frac{\partial x_k}{\partial x_{k-1}}\frac{\partial x_{k-1}}{\partial z_{k-1}}=J_{fz}(\hat{x}_k)AJ_{fx}(\hat{z}_{k-1});$$

$Q_{k-1}^{MSC}=J_{fz}(\hat{x}_{k|k})Q_{k-1}J_{fz}(\hat{x}_{k|k})'$. Here, the J terms represent the Jacobian matrix of MSC and RCC states.

In certain embodiments, the nonlinear function mapping of the RCC state to the MSC state, $f_z(x)$ is as follows:

$$z_1=\frac{1}{r}=\frac{1}{\sqrt{x_1^2+x_2^2+x_3^2}}$$

$$z_2=\varphi=\operatorname{atan}\left(\frac{x_2}{x_1}\right)$$

$$z_3=\theta=\operatorname{atan}\left(\frac{x_3}{\sqrt{x_1^2+x_2^2}}\right)$$

$$z_4=\frac{\dot{r}}{r}=\frac{x_1x_4+x_2x_5+x_3x_6}{x_1^2+x_2^2+x_3^2}$$

$$z_5=\Omega=\dot{\varphi}\cos\theta=\frac{x_1x_5-x_2x_4}{x_1^2+x_2^2}\cos\left(\operatorname{atan}\frac{x_3}{\sqrt{x_1^2+x_2^2}}\right)$$

$$z_6=\dot{\theta}=\frac{x_6(x_1^2+x_2^2)-x_3(x_1x_4+x_2x_5)}{(x_1^2+x_2^2+x_3^2)\sqrt{x_1^2+x_2^2}}$$

The Jacobian of $f_z(x)$ ($J_z(x)$) is computed as follows where $z_i$ and $x_i$, i=1, 2, ..., 6 (MSC and RCC state variables) are defined as described herein.

$$J_z(x_1,x_2,\ldots,x_6)=\begin{bmatrix} \frac{\partial z_1}{\partial x_1} & \frac{\partial z_1}{\partial x_2} & \cdots & \frac{\partial z_1}{\partial x_6} \\ \frac{\partial z_2}{\partial x_1} & \frac{\partial z_2}{\partial x_2} & \cdots & \frac{\partial z_2}{\partial x_6} \\ \vdots & \vdots & \ddots & \vdots \\ \frac{\partial z_6}{\partial x_1} & \frac{\partial z_6}{\partial x_2} & \cdots & \frac{\partial z_6}{\partial x_6} \end{bmatrix}=\begin{bmatrix} J_{z11} & J_{z12} & \cdots & J_{z16} \\ J_{z21} & J_{z22} & \cdots & J_{z26} \\ \vdots & \vdots & \ddots & \vdots \\ J_{z61} & J_{z62} & \cdots & J_{z66} \end{bmatrix}$$

Such that Jz11=−x1/(x1^2+x2^2+x3^2)(3/2); Jz12=−x2/(x1^2+x2^2+x3^2)(3/2); Jz13=−x3/(x1^2+x2^2+x3^2)(3/2); Jz14=0; Jz15=0; Jz16=0; Jz21=−x2/(x1^2*(x2^2/x1^2+1)); Jz22=1/(x1*(x2^2/x1^2+1)); Jz23=0; Jz24=0; Jz25=0; Jz26=0; Jz31=−(x1*x3)/((x3^2/(x1^2+x2^2)+1)*(x1^2+x2^2)(3/2)); Jz32=−(x2*x3)/((x3^2/(x1^2+x2^2)+1)*(x1^2+x2^2)(3/2)); Jz33=1/((x3^2/(x1^2+x2^2)+1)*(x1^2+x2^2)(1/2)); Jz34=0; Jz35=0; Jz36=0; Jz41=x4/(x1^2+x2^2+x3^2)−(2*x1*(x1*x4+x2*x5+x3*x6))/(x1^2+x2^2+x3^2)2; Jz42=x5/(x1^2+x2^2+x3^2)−(2*x2*(x1*x4+x2*x5+x3*x6))/(x1^2+x2^2+x3^2)2; Jz43=x6/(x1^2+x2^2+x3^2)−(2*x3*(x1*x4+x2*x5+x3*x6))/(x1^2+x2^2+x3^2)2; Jz44=x1/(x1^2+x2^2+x3^2); Jz45=x2/(x1^2+x2^2+x3^2); Jz46=x3/(x1^2+x2^2+x3^2); Jz51=(x5*a tan(x3/(x1^2+x2^2)(1/2)))/(x1^2+x2^2)−(2*x1*a tan(x3/(x1^2+x2^2)(1/2))*(x1*x5−x2*x4))/(x1^2+x2^2)2−(x1*x3*(x1*x5−x2*x4))/((x3^2/(x1^2+x2^2)+1)*(x1^2+x2^2)(5/2)); Jz52 (x4*a tan(x3/(x1^2+x2^2)(1/2)))/(x1^2+x2^2)−(2*x2*a tan(x3/(x1^2+x2^2)(1/2))*(x1*x5−x2*x4))/(x1^2+x2^2)2−(x2*x3*(x1*x5−x2*x4))/((x3^2/(x1^2+x2^2)+1)*(x1^2+x2^2)(5/2)); Jz53=(x1*x5−x2*x4)/((x3^2/(x1^2+x2^2)+1)*(x1^2+x2^2)(3/2)); Jz54=−(x2*a tan(x3/(x1^2+x2^2)(1/2)))/(x1^2+x2^2); Jz55=(x1*a tan(x3/(x1^2+x2^2)(1/2)))/(x1^2+x2^2); and Jz56=0.

Jz61=2*x1*x6−(x3*x4)/((x1^2+x2^2)(1/2)*(x1^2+x2^2+x3^2))+(2*x1*x3*(x1*x4+x2*x5))/((x1^2+x2^2)(1/2)*(x1^2+x2^2+x3^2)2)+(x1*x3*(x1*x4+x2*x5))/((x1^2+x2^2)(3/2)*(x1^2+x2^2+x3^2)); Jz62=2*x2*x6−(x3*x5)/((x1^2+x2^2)(1/2)*(x1^2+x2^2+x3^2))+(2*x2*x3*(x1*x4+x2*x5))/((x1^2+x2^2)(1/2)*(x1^2+x2^2+x3^2)2)+(x2*x3*(x1*x4+x2*x5))/((x1^2+x2^2)(3/2)*(x1^2+x2^2+x3^2)); Jz63=(2*x3^2*(x1*x4+x2*x5))/((x1^2+x2^2)(1/2)*(x1^2+x2^2+x3^2)2)−(x1*x4+x2*x5)/((x1^2+x2^2)*(x1^2+x2^2+x3^2)); Jz64=−(x1*x3)/((x1^2+x2^2)(1/2)*(x1^2+x2^2+x3^2)); Jz65=−(x2*x3)/((x1^2+x2^2)(1/2)*(x1^2+x2^2+x3^2)); and Jz66=x1^2+x2^2Jz36=0.

In certain embodiments, the nonlinear function mapping of the MSC state to the RCC state, $f_x(z)$ is as follows:

$$x_1=r\cos\theta\cos\varphi=\left(\frac{1}{z_1}\right)\cos(z_3)\cos(z_2)$$

$$x_2=r\cos\theta\sin\varphi=\left(\frac{1}{z_1}\right)\cos(z_3)\sin(z_2)$$

$$x_3=r\sin\theta=\left(\frac{1}{z_1}\right)\sin(z_3)$$

$$x_4=\dot{r}\cos\theta\cos\varphi-r\dot{\theta}\sin\theta\cos\varphi-r\omega\sin\varphi=\left(\frac{1}{z_1}\right)[z_4\cos(z_2)\cos(z_3)-z_5\sin(z_2)-z_6\cos(z_2)\sin(z_3)]$$

$$x_5=\dot{r}\cos\theta\sin\varphi-r\dot{\theta}\sin\theta\sin\varphi+r\omega\cos\varphi=\left(\frac{1}{z_1}\right)[z_4\cos(z_2)\cos(z_3)-z_5\sin(z_2)-z_6\cos(z_2)\sin(z_3)]$$

$$x_6=\dot{r}\sin\theta+r\dot{\theta}\cos\theta=\left(\frac{1}{z_1}\right)[z_4\sin(z_3)+z_6\cos(z_3)]$$

For $f_x(z)$ ($J_x(z)$),

The Jacobian is defined by $$J_x(z_1, z_2, \ldots, z_6) = \begin{bmatrix} \frac{\partial x_1}{\partial z_1} & \frac{\partial x_1}{\partial z_2} & \cdots & \frac{\partial x_1}{\partial z_6} \\ \frac{\partial x_2}{\partial z_1} & \frac{\partial x_2}{\partial z_2} & \cdots & \frac{\partial x_2}{\partial z_6} \\ \vdots & \vdots & \ddots & \vdots \\ \frac{\partial x_6}{\partial z_1} & \frac{\partial x_6}{\partial z_2} & \cdots & \frac{\partial x_6}{\partial z_6} \end{bmatrix} = \begin{bmatrix} J_{x11} & J_{x12} & \cdots & J_{x16} \\ J_{x21} & J_{x22} & \cdots & J_{x26} \\ \vdots & \vdots & \ddots & \vdots \\ J_{x61} & J_{x62} & \cdots & J_{x66} \end{bmatrix}$$

Such that Jx11=−(cos(z2)*cos(z3))/z1^2; Jx12=−(cos(z3)*sin(z2))/z1; Jx13=−(cos(z2)*sin(z3))/z1; Jx14=0; Jx15=0; Jx16=0; Jx21=−(cos(z3)*sin(z2))/z1^2; Jx22=(cos(z2)*cos(z3))/z1; Jx23=−(sin(z2)*sin(z3))/z1x; Jx24=0; Jx25=0; Jx26=0; Jx31=sin(z3)/z1^2; Jx32=0; Jx33=−cos(z3)/z1; Jx34=0; Jx35=0; Jx36=0; Jx41=(z5*sin(z2)−z4*cos(z2)*cos(z3) z6*cos(z2)*sin(z3))/z1^2; Jx42=−(z5*sin(z2)+z4*cos(z3)*sin(z2)−z6*sin(z2)*sin(z3))/z1; Jx43=−(z6*cos(z2)*cos(z3)+z4*cos(z2)*sin(z3))/z1; Jx44=(cos(z2)*cos(z3))/z1; Jx45=−sin(z2)/z1; and Jx46 (cos(z2)*sin(z3))/z1.

Jx51=−(z5*cos(z2)+z4*cos(z3)*sin(z2)−z6*sin(z2)*sin(z3))/z1^2; Jx52=−(z5*sin(z2)−z4*cos(z2)*cos(z3)+z6*cos(z2)*sin(z3))/z1; Jx53=−(z6*cos(z3)*sin(z2)+z4*sin(z2)*sin(z3))/z1; Jx54=(cos(z3)*sin(z2))/z1; Jx55=cos(z2)/z1; Jx56=−(sin(z2)*sin(z3))/z1; Jx61=(z6*cos(z3)+z4*sin(z3))/z1^2; Jx62=0; Jx63=−(z4*cos(z3)−z6*sin(z3))/z1; and Jx64=−sin(z3)/z1; Jx65=0; and Jx66=−cos(z3)/z1.

Still referring to FIG. 2, following the time update a conversion from RCC to MSC 14 is completed according to $\hat{z}_{k|k-1}=f_z(\hat{x}_{k|k-1})$. This data is fed into the measurement update phase of the process 16, where the measurements update is in MSC according to the following:

$\varepsilon_k = y_k - C\hat{z}_{k|k-1}$, where C=[0 1 0 0 0 0 0 0 1 0 0 0] is derivative free.

$\hat{z}_{k|k} = \hat{z}_{k|k-1} K\varepsilon_k$ $\hat{P}_{k|k} = \hat{P}_{k|k-1} - KC\hat{P}_{k|k-1}$ $K = \hat{P}_{k|k-1} C^T S^{-1}$ $S = C\hat{P}_{k|k-1} C^T + R_k$, where $R_k$ is the EO/IR measurements noise covariance matrix. The cycle repeats itself by proceeding to the MSC to RCC transformation phase 10.

Figure 3:
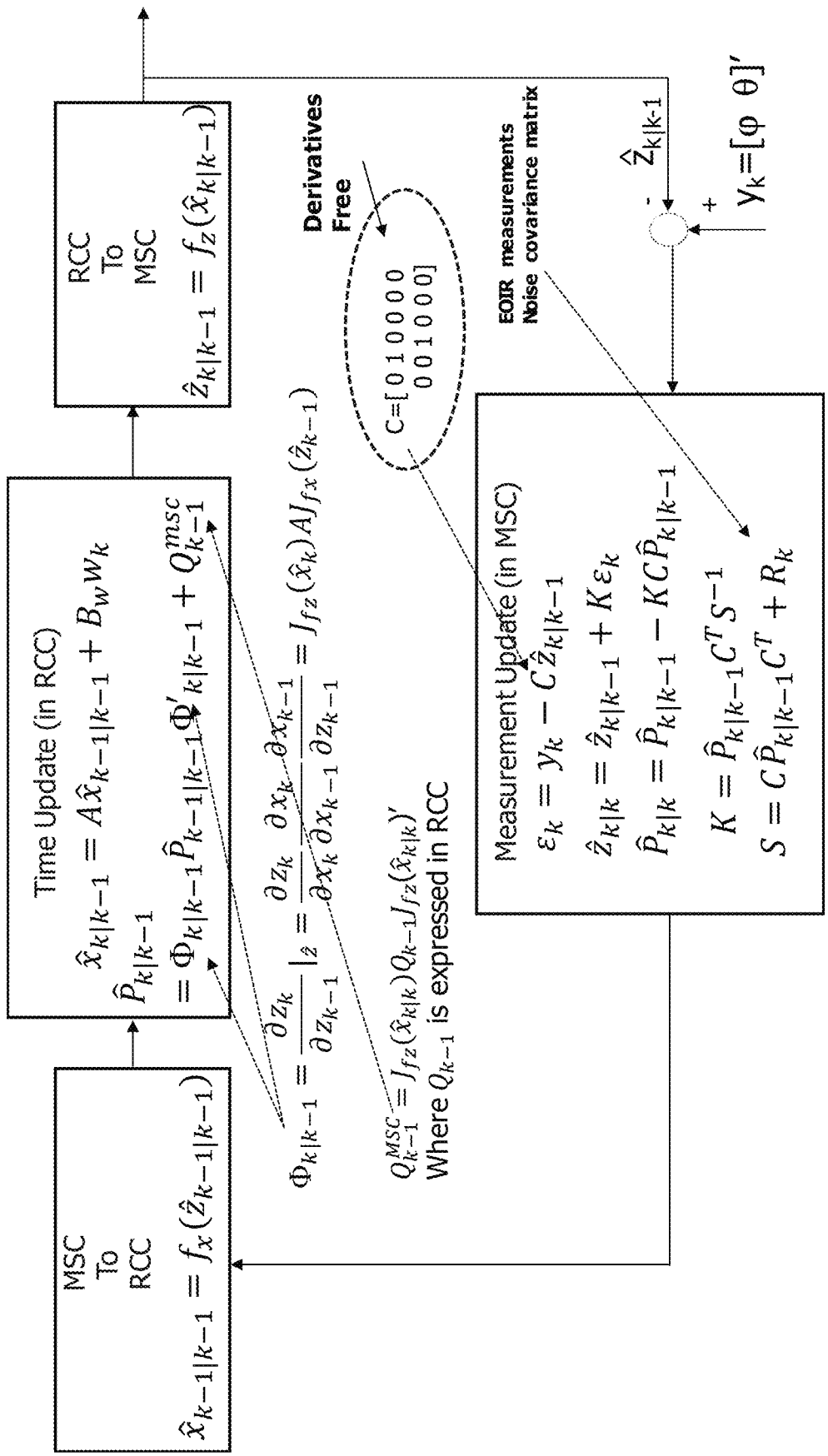
FIG. 3 illustrates one embodiment of a closed-loop processing scheme of the mixed coordinate system approach of the present disclosure with detailed math operation per individual steps
Figure 4:
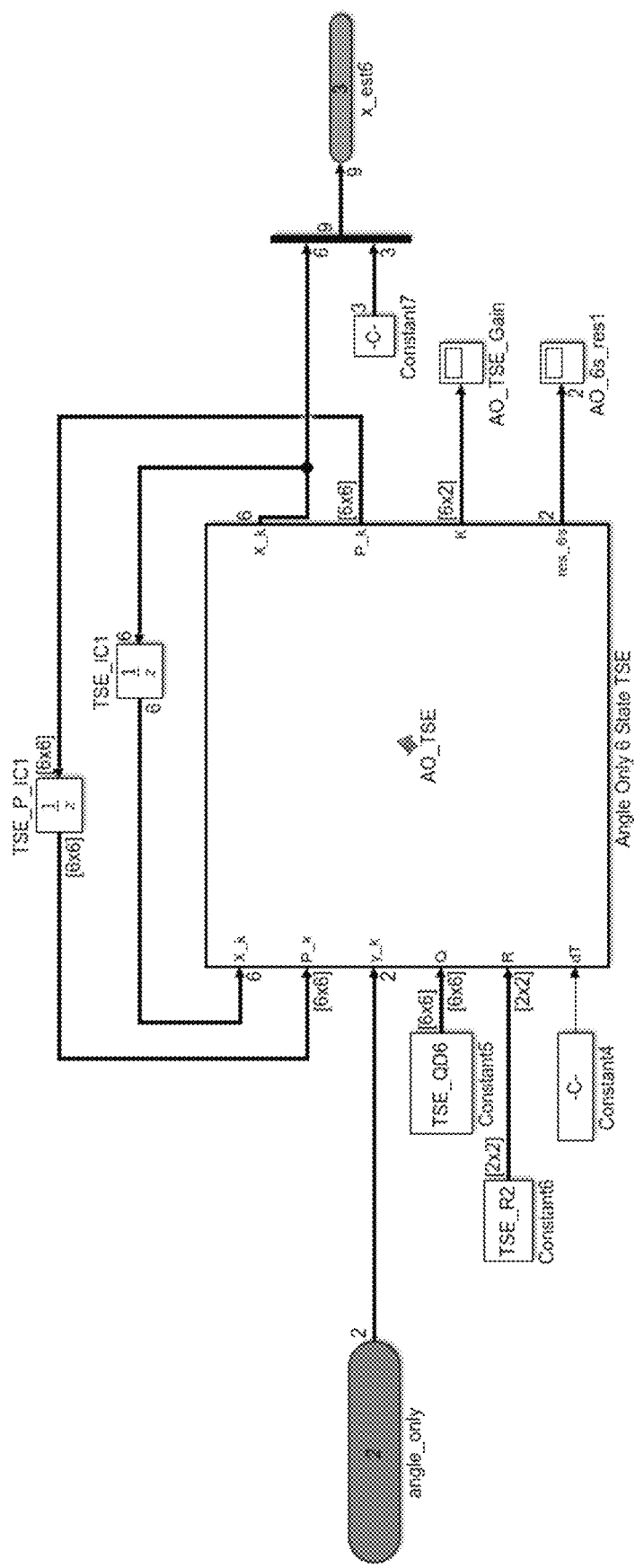
FIG. 4 shows one embodiment of the actual six state angle only (AO) TSE simulation with the I/O definitions of the AO TSE blocks for a weapon-target engagement simulation according to the principles of the present disclosure.

FIG. 3 illustrates the detailed sequential processing steps of the mixed MSC to RCC system to complete the closed-loop AO TSE processing cycle of the mixed coordinate system approach of the present disclosure with detailed math operation per individual steps Referring to FIG. 4, one embodiment of the actual six state angle only (AO) TSE simulation with the I/O definitions of the AO TSE blocks for a weapon-target engagement simulation run according to the principles of the present disclosure is shown.

Figure 5:
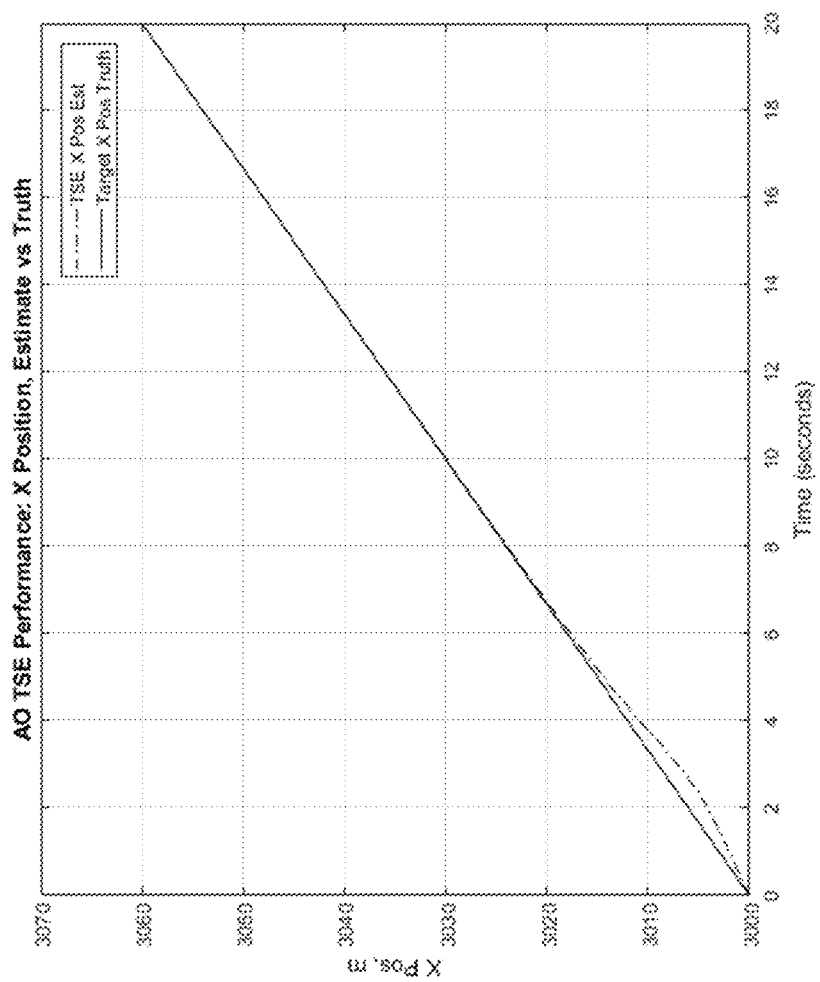
FIG. 5 illustrates how well one embodiment of the AO TSE performs in reconstructing the full 3-D target state vector using the AO measurements X axis.
Figure 6:
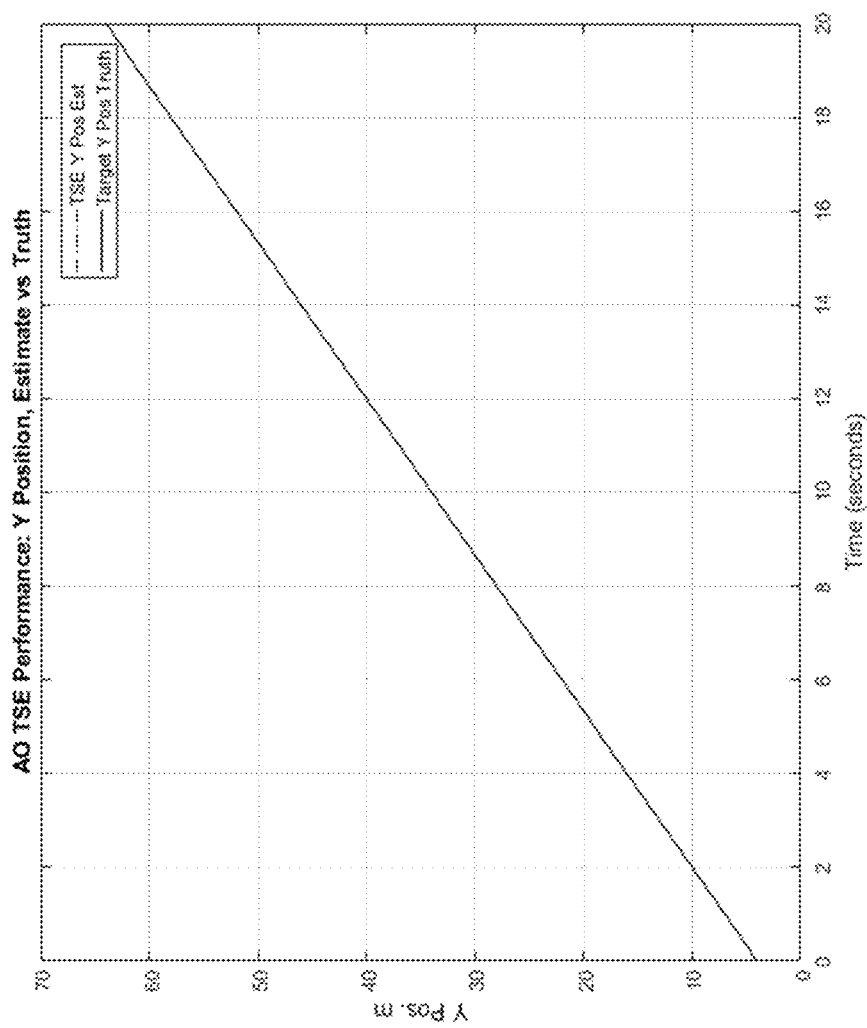
FIG. 6 illustrates how well one embodiment of the AO TSE performs in reconstructing the full 3-D target state vector using the AO measurements Y axis.
Figure 7:
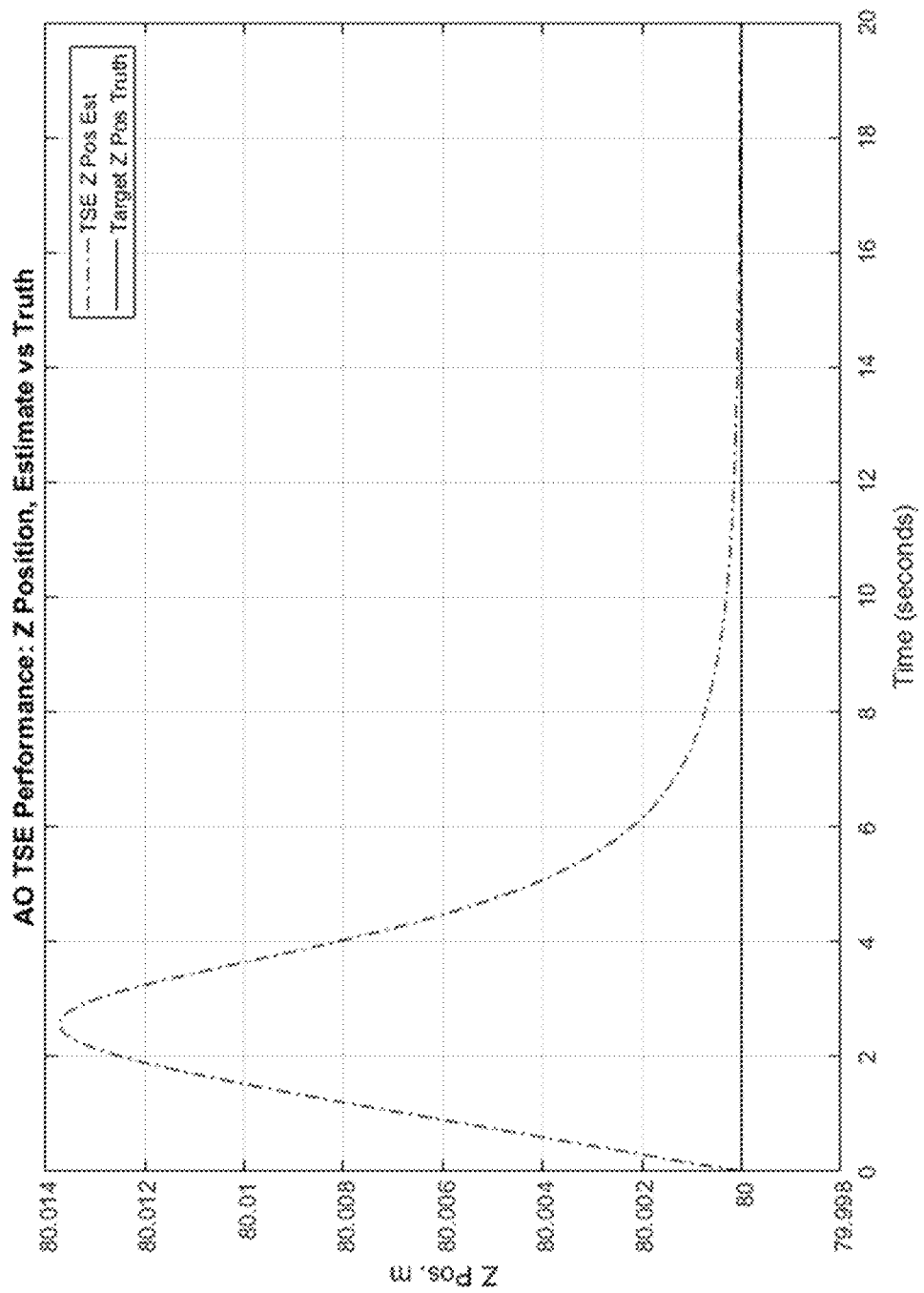
FIG. 7 illustrates how well one embodiment of the AO TSE performs in reconstructing the full 3-D target state vector using the AO measurements Z axis.

FIG. 5 illustrates how well one embodiment of the AO TSE performs in reconstructing the full 3-D target state vector using the AO measurements X axis. FIG. 6 illustrates how well one embodiment of the AO TSE performs in reconstructing the full 3-D target state vector using the AO measurements Y axis. FIG. 7 illustrates how well one embodiment of the AO TSE performs in reconstructing the full 3-D target state vector using the AO measurements Z axis. FIG. 8 illustrates the performance of the AO TSE estimation accuracy in all three axes according to the principles of the present disclosure. These figures provide clear evidence of why the AO TSE of the present disclosure outperforms current state of the art AO TSE. Here, the AO TSE of the present disclosure consistently keeps the position estimation errors in 3 axes<3 m while at steady state, all three axes demonstrate a solid performance of less than 1 m errors The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A complete angle only (AO) target tracking and estimation method comprising:
   initialization states, including $\hat{z}$ and $\hat{x}$ for $f_x$ and $f_z$, of a modified spherical coordinate (MSC) and reference Cartesian coordinate (RCC) system based on operating conditions of an engagement mission;
   calculating modified spherical coordinate (MSC) measurement predictions, including $\hat{z}$ as a function of reference Cartesian coordinate (RCC) and $\hat{x}$ via a nonlinear mapping function $f_z(\hat{x})$; and
   calculating mixed coordinate system blocks, including $J_{fx}$, $J_{fz}$, $\Phi$, and $Q^{MSC}$, to provide for individual mixed AO TSE processing steps for use in angle only (AO) target tracking and estimation with a miss distance accuracy of less than 30 m, using angle only measurement data from a single passive sensor,
   wherein the method is performed on-board a projectile,
   wherein the single passive sensor is configured to track multiple targets.

2. The complete angle only (AO) target tracking and estimation method according to claim 1, wherein a steady state 3-D position error in three axes is less than 1 m.

3. The complete angle only (AO) target tracking and estimation method according to claim 1, wherein the multiple targets are in motion.

4. A complete angle only (AO) target tracking and estimation method, comprising:
   updating angle only (AO) measurements obtained from a single passive sensor in a modified spherical coordinate (MSC) system, wherein the single passive sensor is located on a projectile;
   transforming data from the modified spherical coordinate (MSC) system to a reference Cartesian coordinate (RCC) system;
   time updating in the reference Cartesian coordinate (RCC) system;
   transforming data from the reference Cartesian coordinate (RCC) system to the modified spherical coordinate (MSC) system; and
   calculating the angle only (AO) measurements at a sensor interface level for use in guiding the projectile to a target with a miss distance of less than 30 m,
   performing the method on-board the projectile using the angle only (AO) measurements from the single passive sensor, and
   wherein the single passive sensor is one of infrared search and track (IRST), EO/IR camera, or passive sonar.

5. The complete angle only (AO) target tracking and estimation method according to claim 4, wherein a steady state 3-D position error in three axes is less than 1 m.

6. The complete angle only (AO) target tracking and estimation method according to claim 4, wherein the single passive sensor is configured to track multiple targets.

7. The complete angle only (AO) target tracking and estimation method according to claim 4, wherein the multiple targets are in motion.

8. The complete angle only (AO) target tracking and estimation method according to claim 4, wherein transforming data from the modified spherical coordinate (MSC) system to the reference Cartesian coordinate (RCC) system follows: $\hat{x}_{k-1|k-1} = f_x(\hat{z}_{k-1|k-1})$.

9. The complete angle only (AO) target tracking and estimation method according to claim 4, wherein transforming data from the reference Cartesian coordinate (RCC) system to the modified spherical coordinate (MSC) system follows: $\hat{z}_{k|k-1} = f_z(\hat{x}_{k|k-1})$.

10. The complete angle only (AO) target tracking and estimation method according to claim 4, wherein measurement updating in modified spherical coordinate (MSC) system follows: $\varepsilon_k = y_k - C\hat{z}_{k|k-1}$, where $C = [0\ 1\ 0\ 0\ 0\ 0\ 0\ 1\ 0\ 0\ 0]$ is derivative free, $\hat{z}_{k|k-1} = \hat{z}_{k|k-1} + K\varepsilon_k$, $\hat{P}_{k|k} = \hat{P}_{k|k-1} - KC\hat{P}_{k|k-1}$, $K = \hat{P}_{k|k-1}C^TS^{-1}$, and $S = C\hat{P}_{k|k-1}C^T + R_k$, where $R_k$ is the sensor measurements noise covariance matrix.

11. The complete angle only (AO) target tracking and estimation method according to claim 4, wherein time updating in the reference Cartesian coordinate (RCC) system follows: $\hat{x}_{k|k-1} = A\hat{x}_{k-1|k-1} + B_w w_k$ where $$A = \begin{bmatrix} 1 & 0 & 0 & T & 0 & 0 \\ 0 & 1 & 0 & 0 & T & 0 \\ 0 & 0 & 1 & 0 & 0 & T \\ 0 & 0 & 0 & 1 & 0 & 0 \\ 0 & 0 & 0 & 0 & 1 & 0 \\ 0 & 0 & 0 & 0 & 0 & 1 \end{bmatrix} B_w = \begin{bmatrix} 0.5T^2 & 0 & 0 \\ 0 & 0.5T^2 & 0 \\ 0 & 0 & 0.5T^2 \\ T & 0 & 0 \\ 0 & T & 0 \\ 0 & 0 & T \end{bmatrix},$$

where T=the filter propagation time, $\hat{P}_{k|k-1} = \Phi_{k|k-1}\hat{P}_{k-1|k-1}\Phi'_{k|k-1} + Q_{k-1}^{msc}$, where $Q_{k-1}$ is expressed in RCC, and the rcc state vector is renamed, $\hat{x}^{rcc}_k$ to $\hat{x}_k$;

$$\Phi_{k|k-1} = \frac{\partial z_k}{\partial z_{k-1}}\bigg|_{\hat{z}} = \frac{\partial z_k}{\partial x_k}\frac{\partial x_k}{\partial x_{k-1}}\frac{\partial x_{k-1}}{\partial z_{k-1}} = J_{fz}(\hat{x}_k)A J_{fx}(\hat{z}_{k-1});$$

and $Q_{k-1}^{MSC} = J_{fz}(\hat{x}_{k|k})Q_{k-1}J_{fz}(\hat{x}_{k|k})'$.

12. The complete angle only (AO) target tracking and estimation method according to claim 11, wherein the J terms represent the Jacobian matrix of the MSC and the RCC states.

13. A computer program product including one or more machine-readable mediums encoded with instructions that when executed by one or more processors cause a process to be carried out for complete angle only (AO) target tracking and estimation, the process comprising:
   processing angle only (AO) measurements from a single passive sensor on a projectile;
   updating the angle only (AO) measurements in a modified spherical coordinate (MSC) system;
   transforming data from the modified spherical coordinate (MSC) system to a reference Cartesian coordinate (RCC) system;
   time updating in the reference Cartesian coordinate (RCC) system;
   transforming data from the reference Cartesian coordinate (RCC) system to the modified spherical coordinate (MSC) system; and calculating the angle only (AO) measurements at a sensor interface level for use in guiding the projectile to a target with a miss distance of less than 30 m, wherein the process is performed on-board the projectile.

14. The computer program product according to claim 13, wherein the single passive sensor is one of infrared search and track (IRST), EO/IR camera, or passive sonar.

* * * * *